Jan. 5, 1965   J. D. HOGDEN ETAL   3,164,062
PIPE CUTTER
Filed June 30, 1961   3 Sheets-Sheet 1
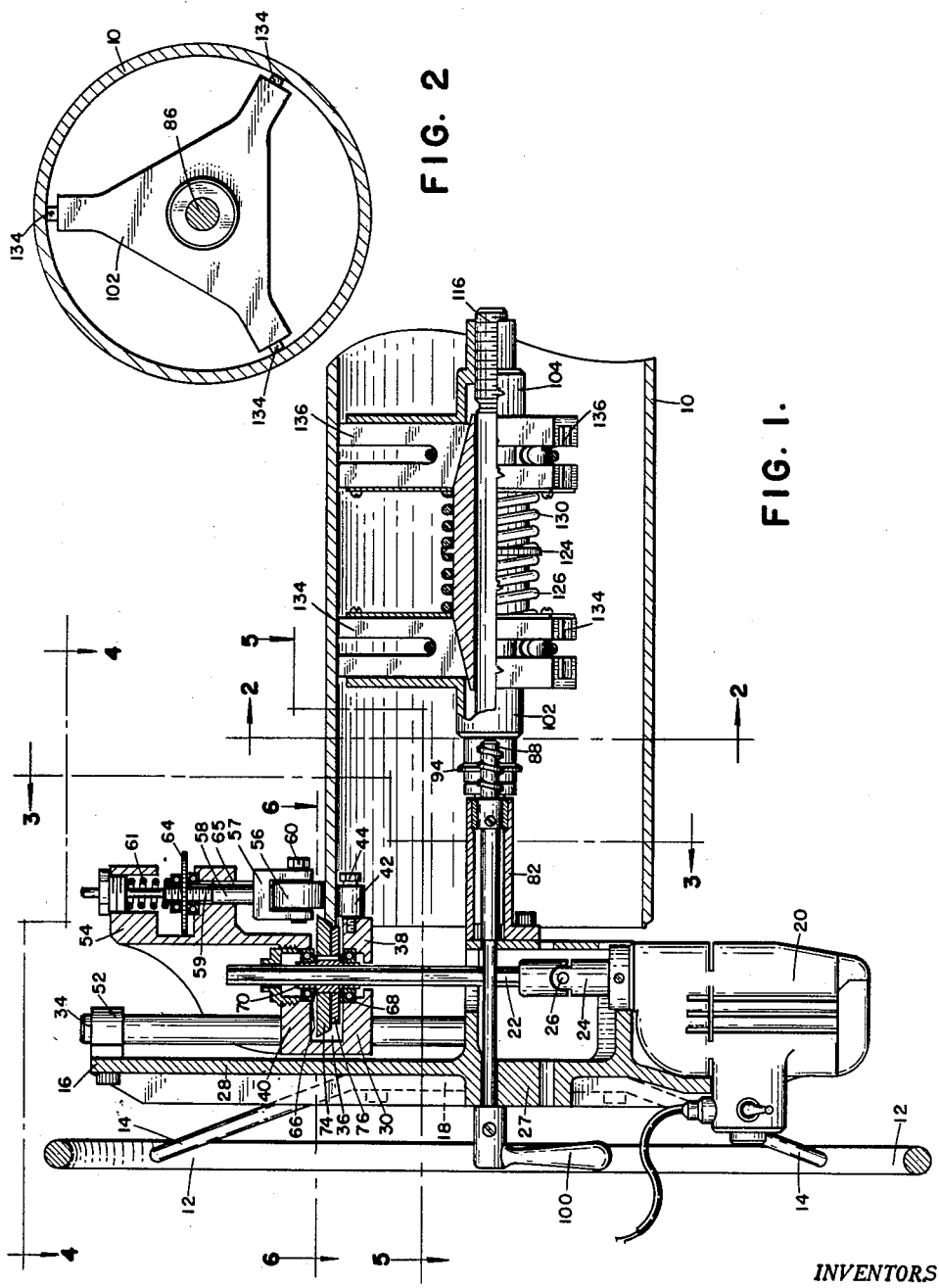
INVENTORS.
JOHN D. HOGDEN,
JOE B. LOVETT,
BY
Frank S. Triodl
ATTORNEY.

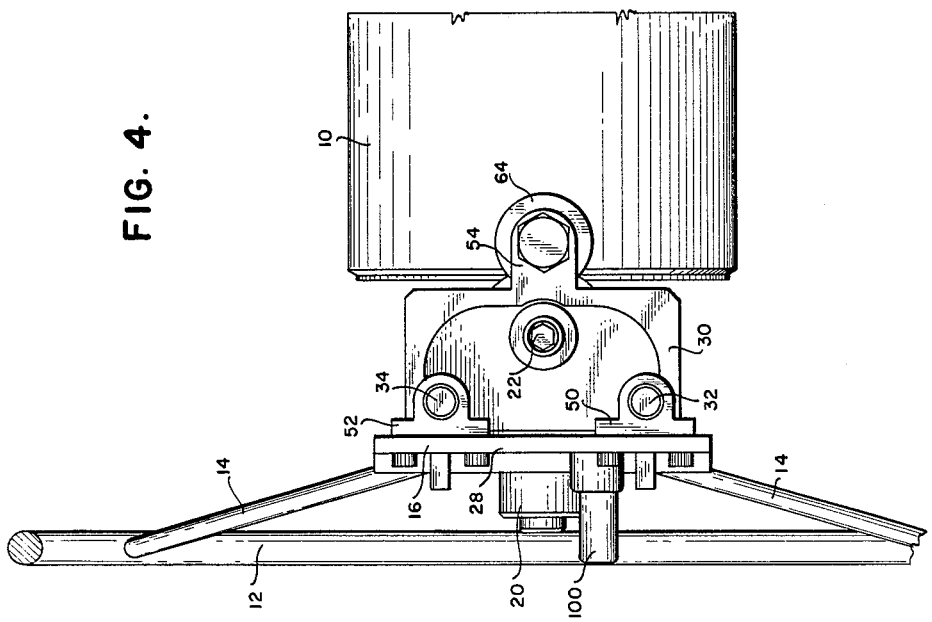
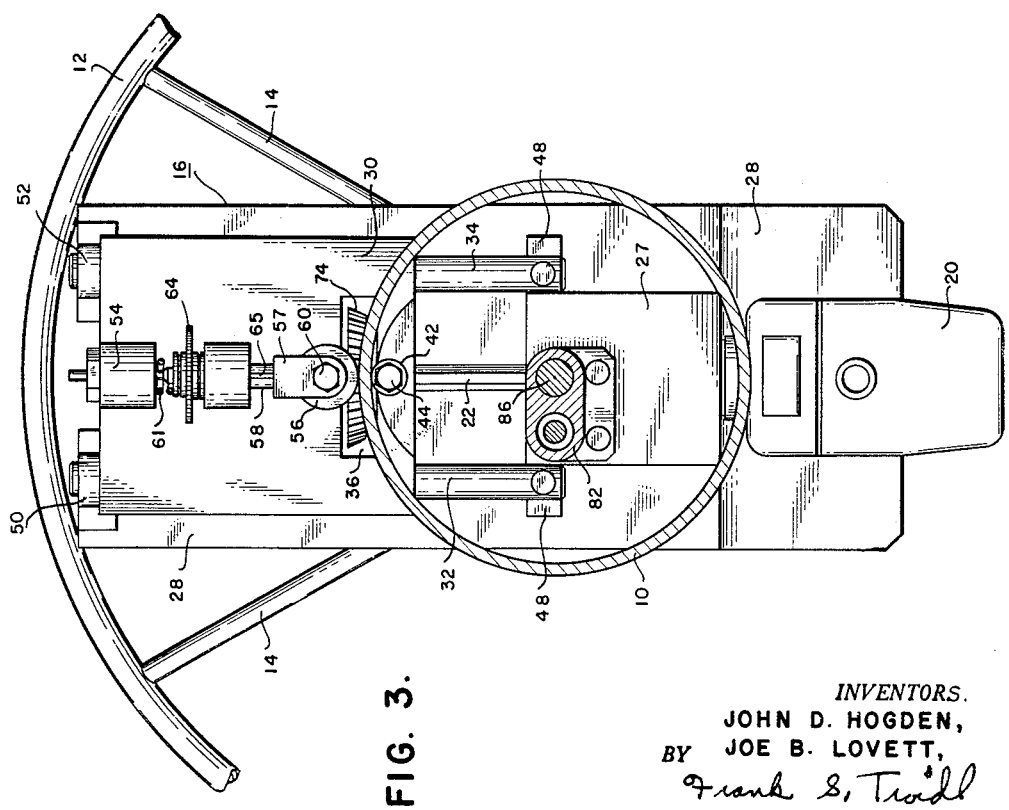

INVENTORS.
JOHN D. HOGDEN,
JOE B. LOVETT,
BY Frank S. Troidl
ATTORNEY.

United States Patent Office 3,164,062
Patented Jan. 5, 1965

3,164,062
PIPE CUTTER
John D. Hogden, 802 Ave. A, and Joe B. Lovett,
506 Ave. A, both of Sweeny, Tex.
Filed June 30, 1961, Ser. No. 121,197
7 Claims. (Cl. 90—12)

This invention relates to machines for cutting pipe. More particularly, this invention relates to machines for cutting bevels on the edge of a pipe.

This application is a continuation-in-part of our co-pending application Serial No. 12,760, filed March 4, 1960, and now Patent No. 3,067,651, entitled "Pipe Cutter."

The usual method of cutting bevels of any degree or shape on a pipe is to mount the pipe on a lathe and form the bevel. If it is desired to provide a pipeline for the transportation of various fluids in the field, the pipe must be beveled in the workshop on a lathe and then transported to the field where the pipe sections are welded together. Obviously, a portable machine which is light in weight and which can be used in the field and shops to machine bevels of any degree or shape on pipe is highly desirable.

The pipe cutter to be described herein provides a portable machine which is light in weight and can be used in the field or the shops to machine the required bevels on pipe and also machine a perfectly square joint to facilitate the alignment of the joint to be welded.

Figure 5:
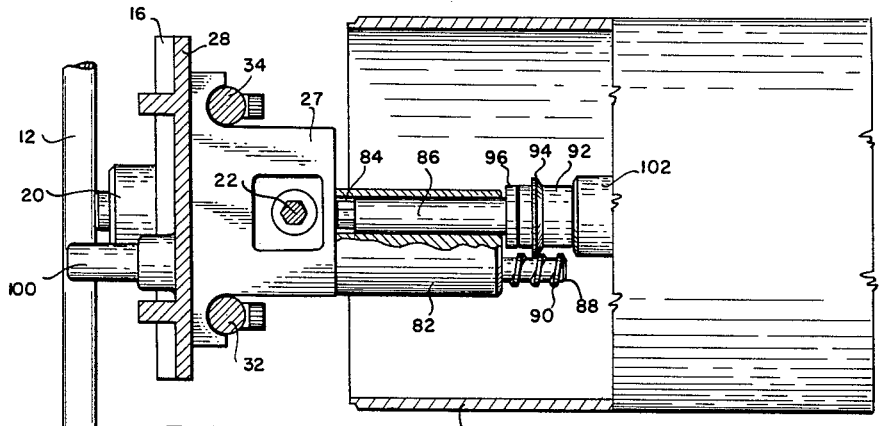
Figure 5A:
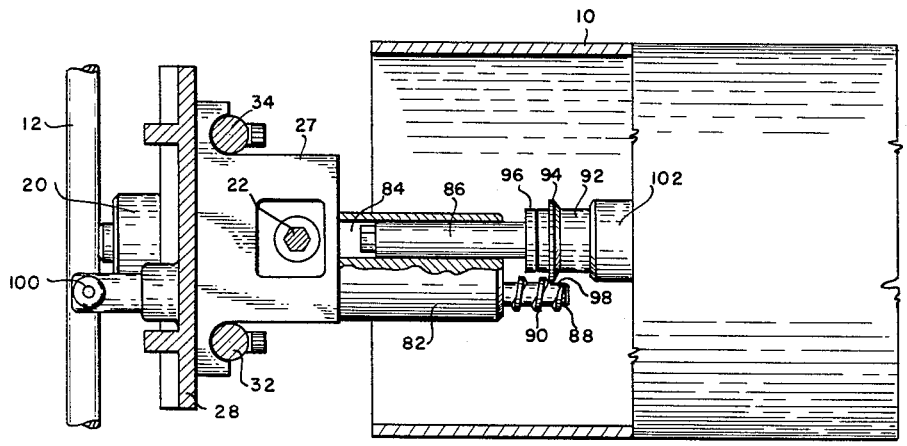
Figure 6:
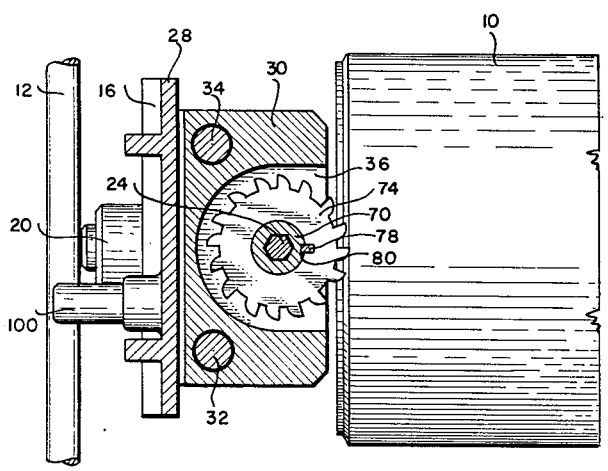

The invention, as well as its many advantages, will be further understood by reference to the following detailed description and drawings in which:

FIG. 1 is an elevational view, partly in section, showing the machine and its component parts in position to form the bevel on the edge of a pipe;

FIG. 2 is a view taken along lines 2—2 of FIG. 1;
FIG. 3 is a view taken along lines 3—3 of FIG. 1;
FIG. 4 is a view taken along lines 4—4 of FIG. 1;
FIG. 5 is a view taken along lines 5—5 of FIG. 1;
FIG. 5A is a view similar to FIG. 5 but showing the manner in which the locking screw is lockingly engaged with the rotatable sleeve;
FIG. 6 is a view taken along lines 6—6 of FIG. 1.

Referring to the drawings, and particularly FIG. 1, a pipe 10 is shown in position for the cutting of the bevel of desired shape on the edge of the pipe. The machine includes a wheel 12. As shown in FIG. 1 and FIG. 3, wheel 12 may be provided with radial spokes 14. This provides for a light and easily handled portable machine.

Referring again to FIG. 1, a framework 16 is shown bolted to the hub 18 of the wheel 12. Framework 16 supports an electric motor 20. If desired, an air motor can be used in place of electric motor 20.

A rotatable shaft 22 has its inner end connected to the drive shaft 24 extending from the motor 20 by a universal joint 26. Joint 26 is located within housing 27 which is integrally connected to frame 16. Rotatable shaft 22 extends outwardly from the joint 26 in a plane substantially parallel to the plane of the horizontal portion 28 of framework 16.

An adjustable bearing block 30 is mounted for slidable movement upon a pair of guide rods 32 and 34 (see FIG. 3). Guide rods 32 and 34 are generally cylindrical in shape with their inner ends mounted to lugs 48 extending from housing 27 (FIG. 3 and FIG. 5). The outer ends of guide rods 32 and 34 are supported by rod supports 50 and 52 respectively, which are bolted to framework portion 28.

The adjustable bearing block 30 is provided with a slot 36 which extends inwardly from an edge thereof to form an inner extending portion 38 and an outer extending portion 40. An inner roller bearing wheel 42 is bolted by means of bolt 44 to the lower extremity of the inner member 38.

An outer roller bearing wheel support 54 is integrally connected to block 30 which extends outwardly from the portion 40 of bearing block 30. An outer roller bearing wheel 56 is mounted within a U-shaped member 57 by means of bolt 60. A rod 58 extends from U-shaped member 57 and through support 54. A knurled wheel 64 is mounted about the threaded portion of rod 58 and rotates within a slot provided in member 54. Thus, the adjustable roller bearing wheel 56 may be adjusted to contact the outer perimeter of the pipe 10 by rotation of knurled wheel 64. A key 65 keeps wheel 56 horizontal during adjustment of the position of wheel 56.

The inside roller bearing 42 should be kept in contact with the pipe 10 at all times during cutting. This provides for a land thickness on the edge of the pipe 10 which is the same around the entire perimeter. Often the outside perimeter of a pipe to be beveled varies. Therefore, the outer roller bearing 56 must be constructed so as to give when the thickness of the pipe varies around the outer perimeter and yet hold sufficient tension so that the inside roller 42 is always in contact with the inside of the pipe.

The rod 58 having a threaded portion 59 extends perpendicularly from the outer edge of the pipe 10. A compression spring 61 is mounted about the rod 58 and within the outer roller bearing wheel support 54. The compression spring 61 exerts pressure against the outer roller bearing 56 but yet gives with variation of the outside perimeter of pipe 10. By having the perpendicular arrangement of the rod 58 and the pipe 10 with the spring 61 wound about the rod 58, the outward movement of the roller bearing wheel 56, with increasing outside perimeter of the pipe 10, is always perpendicular to the side of the pipe 10. Otherwise, the outer roller bearing 56 would tend to bite into the pipe 10.

The knurled wheel 64 extends outwardly from the groove in support 54. Hence, when the pipe cutter has been placed on the edge of the pipe 10 with the inner roller bearing 42 in contact with the inside of the pipe, the outer roller bearing wheel 56 can be moved into contact with the outside of the pipe 10 by turning the knurled wheel 64.

A roller bearing 66 is mounted in extending member 40. A second roller bearing 68 is mounted within the inner extending portion 30. Supported for rotational movement within the bearings 66 and 68 is a sleeve 70 coaxially mounted about shaft 22. The sleeve 70 has a central portion of greater diameter upon which are mounted a first cutter 74 and a second cutter 76. Cutters 74 and 76 are securely mounted to the sleeve 70 by means of a key 78 fitting in the groove 80 within sleeve 70 (see FIG. 6). It is to be understood that if desired, the cutters 74 and 76 may be integrally connected to provide one cutter of the proper dimensions and shape.

The rotatable shaft 22 is hexagonal in cross section. The inner periphery of the sleeve 70 is also hexagonal to mate with the shape of shaft 22. The provision of this mating arrangement permits the cutters to be moved longitudinally along the shaft 22 without any rotational movement of sleeve 70 with respect to shaft 22. Shaft 22 may be of any other shape to prevent rotation of sleeve 70, such as octagonal or splined.

Cutter 74 is shaped to provide the desired cut on the edge of pipe 10. It is to be understood that though a cutter shaped to provide a beveled cut is shown in the figure, various other shaped cutters can be used to form any desired shape or cut. The inner cutter 76 is smaller in diameter than the outer cutter 74. Cutter 76 is shaped to provide a perfectly flat edge on the end of the pipe 10.

When the pipe cutter is used for cutting softer materials such as aluminum, copper, lead, and plastics, it is relatively easy to hold the cutter in contact with the edge of the pipe during the cutting operation. However, when cutting hard materials such as steel and stainless steel, considerable force is required to push the machine to the bottom of the cut and hold it there. Accordingly, we have provided the art with a new combination of pipe cutter and centering mandrel with a means for interlocking the two so that the pipe cutter will be automatically locked to the centering mandrel and the pipe, thus eliminating the requirement of a high manual force to keep the cutter in the proper place.

A cylindrical body member 82 extends outwardly from the housing 27 (see FIG. 5 and FIG. 5A). The cylindrical member 82 has a bore 84 formed therein. Bore 84 is adapted to be placed over a spindle or rotatable shaft 86 forming part of the centering mandrel to be subsequently described.

A manually rotatable locking screw 88 having a helical thread 90 is mounted on the frame of the pipe cutter. The locking screw 88 extends through the frame, the housing 27, and the cylindrical body 82. The locking screw 88 extends substantially parallel to the spindle 86.

A rotatable sleeve 92 is mounted about the spindle 86. Rotatable sleeve 92 has a collar 94 adapted to be engaged by the helical thread 90 of locking screw 88. A locking collar 96 which is securely locked to the spindle 86 prevents translational movement of the rotatable sleeve 92 after the centering mandrel has been securely locked within the pipe 10 in a manner to be subsequently described.

Notice that the helical thread 90 is cut off at 98; therefore, the member 82 can be placed over the spindle 86 and the locking screw 88 rotated by means of screw handle 100 to engage the upper surface of the helical thread 90 with the undersurface of the collar 94 on rotatable sleeve 92.

In operating the pipe cutter and centering mandrel interlocking mechanism, the centering mandrel is placed into the pipe 10, leaving the end of the spindle 86 at a position which determines the desired depth of cut or correct length of pipe if it is desired to shorten the pipe. The cylindrical portion 82 slides over the end of the spindle 86, with the pipe cutter at the right position to allow the inside roller 42 and outside roller 56 to clear the pipe 10 as the machine is pulled into the pipe.

When the helical thread 90 contacts collar 94, the machine can no longer be pushed any further into the pipe 10. At this point handle 100 is turned in the proper direction to engage the upper side of the helical thread 90 with the underside of the collar 94 on rotatable sleeve 92. The outer roller 56 is then brought against the outside of the pipe, forcing the inner roller 42, which is rigid with respect to the cutters 74 and 76, into contact with the inside of the pipe 10. After this is done, the motor 20 is turned on and the machine is turned slowly in one direction while the handle 100 is turned slowly in the same direction so that the collar 94 rides along the upper side of helical thread 90 until the end of spindle 86 engages the housing 27.

When the end of spindle 86 engages the housing 27, the cutters are pushed as far as they can go into the pipe 10 and the cutter is locked securely to the centering mandrel. The locked position is shown in FIG. 5.

The frame is then rotated. As the frame is rotated, the rotatable sleeve 92 turns on the spindle 86. However, no slippage occurs between collar 94 and helical thread 90. When the frame has been turned a complete 360° circle, the bevel of proper depth has been cut.

This action of the centering mandrel locking to the inside of the pipe 10, the pipe cutter to the centering mandrel, and the pipe cutter to the pipe 10 with the two rollers makes the machine very rigid because the machine is locked on the pipe which it is cutting.

After the centering mandrel has been properly locked within the pipe, the pipe cutter portion is inserted into the pipe with the spindle 86 in bore 84.

The pipe cutter is then locked to the centering mandrel in the manner previously described and the frame turned a complete revolution to form the desired bevel on the end of the pipe.

We claim:
1. A machine for cutting bevels on the extremities of pipe comprising: a frame; power means mounted on the frame; a rotatable shaft operatively connected to the power means and extending in a plane parallel to the frame; two adjacent cutters slidably mounted on the rotatable shaft, with one cutter being of shorter radius than the other; a roller bearing wheel support; means adapted to permit slidable movement of the roller bearing wheel support along a plane parallel to the frame means upon which a roller bearing wheel is mounted and including a rod which extends from said roller bearing wheel support and parallel to the frame; and a compression spring mounted within said roller bearing wheel support and about said rod and adapted to give with variations in thickness around the perimeter of the pipe, so that the cutter can be placed on the edge of the pipe, the power means operated, and the frame turned to form the bevel.

2. A machine in accordance with claim 1 wherein a portion of the rod is threaded and an adjustment wheel is mounted about said threaded portion for manual adjustment of the roller bearing wheel.

3. A machine for cutting bevels on the extremities of pipe comprising: a frame; a housing mounted on the frame; a rotatable shaft extending from the housing in a plane parallel to the frame; power means for rotating said rotatable shaft; a radially adjustable block member through which the rotatable shaft extends, said block member having a slot formed therein from an edge thereof; at least one cutter slidably mounted about the rotatable shaft and within the slot in said radially adjustable block member; a first roller bearing wheel mounted on the bottom of the block member adjacent the inner side of the slot and adapted to engage the inside perimeter of the pipe; an outer roller bearing wheel support extending outwardly from the bottom of the block member adjacent the outer side of the slot; means upon which a second roller bearing wheel is mounted and including a rod which extends from said roller bearing wheel support and parallel to the frame; and a compression spring mounted within said roller bearing wheel support and about said rod and adapted to give with variations in thickness around the perimeter of the pipe, so that the cutter can be placed on the edge of the pipe, the power means operated, and the frame turned to form the bevel.

4. A machine in accordance with claim 3 wherein there are two cutters adjacently mounted on the rotatable shaft, with one cutter being of shorter radius than the other.

5. A machine in accordance with claim 4 wherein a portion of the rod is threaded and an adjustment wheel is mounted about said threaded portion for manual adjustment of the roller bearing wheel.

6. In combination: a mandrel including a shaft, means responsive to rotation of said shaft for locking the mandrel within a pipe and parallel to the axis of said pipe to thereafter prevent further rotation of the shaft, a rotatable sleeve mounted on the shaft having a collar formed thereon, and means for preventing translational movement of the rotatable sleeve along the shaft; and a pipe cutter including cutters for cutting the pipe, and a locking screw for lockingly engaging the collar on the rotatable sleeve so that the pipe cutter can be lockingly engaged with the rotatable sleeve after the mandrel has been locked within the pipe and the pipe cutter rotated about the axis of the shaft to cut the pipe.

7. In combination: a mandrel including a shaft, means responsive to rotation of said shaft for locking the mandrel within a pipe and parallel to the axis of said pipe to thereafter prevent further rotation of said shaft, a rotatable sleeve mounted on the shaft having a collar formed thereon, and means for preventing translational movement of the rotatable sleeve along the shaft; a frame; a housing mounted on the frame; a rotatable shaft extending from the housing in a plane parallel to the frame; power means for rotating said rotatable shaft; a radially adjustable block member through which the rotatable shaft extends, said block member having a slot formed therein from an edge thereof; at least one cutter slidably mounted about the rotatable shaft and within the slot in said radially adjustable block member; a roller bearing wheel mounted on the bottom of the block member adjacent the inner side of the slot and adapted to engage the inside perimeter of the pipe; an outer roller bearing wheel support extending outwardly from the bottom of the block member adjacent the outer side of the slot; an outer roller bearing wheel connected to the outer roller bearing wheel support; a manually rotatable locking screw extending from the frame and adapted to engage the collar on the rotatable sleeve so that the mandrel can be locked within the pipe, the frame locked to the mandrel, and the frame then rotated to form a bevel on the end of the pipe.

References Cited by the Examiner
UNITED STATES PATENTS

| | | | |
|---|---|---|---|
| 2,616,462 | 11/52 | Haddican | 144—205 |
| 2,734,749 | 2/56 | Benjamin | 279—2 |
| 2,746,497 | 5/56 | Thompson | 144—205 |
| 2,984,493 | 5/61 | Lindemann | 279—2 |

FOREIGN PATENTS

| | | |
|---|---|---|
| 715,780 | 1/42 | Germany. |

WILLIAM W. DYER, Jr., *Primary Examiner.*

LEON PEAR, *Examiner.*